United States Patent
Davis et al.

(10) Patent No.: US 9,267,060 B2
(45) Date of Patent: *Feb. 23, 2016

(54) REACTION PRODUCT OF PROPYLENE POLYMER AND WAX, GRAFT COPOLYMERS DERIVED FROM POLYPROPYLENE POLYMER AND WAX, HOT MELT ADHESIVE COMPOSITIONS INCLUDING THE SAME, AND METHODS OF USING AND MAKING THE SAME

(71) Applicant: H.B. Fuller Company, St. Paul, MN (US)

(72) Inventors: Kevin P. Davis, North St. Paul, MN (US); Ameara S Mansour, Minneapolis, MN (US); Sharf U. Ahmed, Woodbury, MN (US); Cheryl L. Chase, White Bear Lake, MN (US); Maynard R. Lawrence, Oakdale, MN (US); Scott C Schmidt, Woodbury, MN (US)

(73) Assignee: H.B. Fuller Company, St. Paul, MN (US)

( * ) Notice: Subject to any disclaimer, the term of this patent is extended or adjusted under 35 U.S.C. 154(b) by 412 days.

This patent is subject to a terminal disclaimer.

(21) Appl. No.: 13/768,887

(22) Filed: Feb. 15, 2013

(65) Prior Publication Data

US 2014/0234645 A1    Aug. 21, 2014

(51) Int. Cl.
*B32B 27/00* (2006.01)
*B32B 7/12* (2006.01)
*C09J 123/26* (2006.01)

(52) U.S. Cl.
CPC ........ *C09J 123/26* (2013.01); *Y10T 428/31808* (2015.04)

(58) Field of Classification Search
None
See application file for complete search history.

(56) References Cited

U.S. PATENT DOCUMENTS

| | | |
|---|---|---|
| 3,539,481 A | 11/1970 | Parker |
| 3,862,265 A | 1/1975 | Steinkamp et al. |
| 3,882,194 A | 5/1975 | Krebaum et al. |
| 3,987,122 A | 10/1976 | Bartz et al. |
| 4,105,718 A | 8/1978 | Hall |
| 4,112,208 A | 9/1978 | McConnell et al. |
| 4,120,916 A | 10/1978 | Meyer, Jr. et al. |
| 4,140,733 A | 2/1979 | Meyer et al. |
| 4,217,428 A | 8/1980 | McConnell et al. |
| 4,477,532 A | 10/1984 | Schmukler et al. |
| 4,506,056 A | 3/1985 | Gaylord |
| 4,567,223 A | 1/1986 | Ames |
| 4,906,690 A | 3/1990 | Hasenbein et al. |
| 5,041,482 A | 8/1991 | Ornsteen et al. |
| 5,041,484 A | 8/1991 | Atwell et al. |
| 5,185,398 A | 2/1993 | Kehr et al. |
| 5,241,014 A | 8/1993 | Kehr et al. |
| 5,302,675 A | 4/1994 | Sustic et al. |
| 5,441,999 A | 8/1995 | Jarvis et al. |
| 5,455,111 A | 10/1995 | Velasquez Urey |
| 5,468,807 A | 11/1995 | Tsurutani et al. |
| 5,534,575 A | 7/1996 | Foster et al. |
| 5,637,410 A | 6/1997 | Bonner et al. |
| 5,723,546 A | 3/1998 | Sustic |
| 5,783,629 A | 7/1998 | Srinivasan et al. |
| 5,955,547 A | 9/1999 | Roberts et al. |
| 5,986,009 A | 11/1999 | Thoen et al. |
| 6,080,818 A | 6/2000 | Thakker et al. |
| 6,100,351 A | 8/2000 | Sun et al. |
| 6,107,430 A | 8/2000 | Dubois et al. |
| 6,143,825 A | 11/2000 | Beren et al. |
| 6,184,327 B1 | 2/2001 | Weng et al. |
| 6,248,832 B1 | 6/2001 | Peacock |
| 6,395,791 B1 | 5/2002 | Chaudhary et al. |
| 6,448,333 B1 | 9/2002 | Rodriquez et al. |
| 6,475,633 B1 | 11/2002 | Robert et al. |
| 6,552,110 B1 | 4/2003 | Yalvac et al. |
| 6,573,350 B1 | 6/2003 | Markel et al. |
| 6,653,385 B2 | 11/2003 | Wang et al. |
| 6,656,601 B1 | 12/2003 | Kawachi et al. |
| 6,747,114 B2 | 6/2004 | Karandinos et al. |
| 6,797,774 B2 | 9/2004 | Kijima |
| 6,872,279 B1 | 3/2005 | Kolowrot et al. |
| 6,936,635 B1 | 8/2005 | Da Silva |
| 6,960,635 B2 | 11/2005 | Stevens et al. |
| 7,067,585 B2 | 6/2006 | Wang et al. |
| 7,223,814 B2 | 5/2007 | Martin et al. |
| 7,232,871 B2 | 6/2007 | Datta et al. |
| 7,262,251 B2 | 8/2007 | Kanderski et al. |

(Continued)

FOREIGN PATENT DOCUMENTS

| | | |
|---|---|---|
| DE | 102008019802 | 10/2009 |
| EP | 0 442 045 | 8/1991 |
| EP | 1 477 499 | 11/2004 |
| EP | 1 498 432 | 1/2005 |
| EP | 2 050 770 | 4/2009 |
| EP | 2 253 648 | 11/2010 |
| EP | 1 833 939 | 3/2011 |
| EP | 2 281 859 | 9/2011 |
| GB | 1 267 472 | 4/1970 |
| WO | WO-95/10575 | 4/1995 |

(Continued)

OTHER PUBLICATIONS

Eastman Product Literature entitled, "Epolene Waxes as Petroleum Wax Modifiers" (Jul. 1997) (10 pages).

(Continued)

*Primary Examiner* — Sheeba Ahmed
(74) *Attorney, Agent, or Firm* — Kirsten Stone; Allison Johnson

(57) ABSTRACT

A reaction product and hot melt adhesive compositions that include the reaction product are disclosed. The reaction product includes the reaction product of a first polymer that includes at least one of polypropylene homopolymer and polypropylene-alpha-olefin copolymer, a first wax that includes at least one of polyethylene wax, Fischer Tropsch wax and paraffin wax, and a free radical initiator and has a viscosity of no greater than 12,000 centipoise at 177° C.

30 Claims, No Drawings

(56) References Cited

U.S. PATENT DOCUMENTS

| | | |
|---|---|---|
| 7,294,681 B2 | 11/2007 | Jiang et al. |
| 7,309,747 B2 | 12/2007 | Minami et al. |
| 7,408,007 B2 | 8/2008 | Roberts et al. |
| 7,459,503 B2 | 12/2008 | Kanamaru et al. |
| 7,517,579 B2 | 4/2009 | Campbell et al. |
| 7,521,507 B2 | 4/2009 | Lewtas et al. |
| 7,524,910 B2 | 4/2009 | Jiang et al. |
| 7,541,402 B2 | 6/2009 | Abhari et al. |
| 7,550,528 B2 | 6/2009 | Abhari et al. |
| 7,683,134 B2 | 3/2010 | Roberts et al. |
| 7,700,707 B2 | 4/2010 | Abhari et al. |
| 7,786,032 B2 | 8/2010 | Zhou et al. |
| 7,812,085 B2 | 10/2010 | Tse et al. |
| 7,968,665 B2 | 6/2011 | Minami et al. |
| 8,076,407 B2 | 12/2011 | Ellis et al. |
| 7,750,078 B2 | 7/2012 | Weemes et al. |
| 8,242,198 B2 | 8/2012 | Jiang et al. |
| 8,263,707 B2 | 9/2012 | Datta et al. |
| 2002/0007033 A1 | 1/2002 | Karandinos et al. |
| 2002/0127389 A1 | 9/2002 | Hanada et al. |
| 2003/0096896 A1 | 5/2003 | Wang et al. |
| 2003/0181554 A1 | 9/2003 | Faissat et al. |
| 2007/0042193 A1 | 2/2007 | Wang et al. |
| 2009/0105407 A1 | 4/2009 | Karjala et al. |
| 2009/0203847 A1 | 8/2009 | Ellis et al. |
| 2009/0306281 A1 | 12/2009 | Tancrede et al. |
| 2010/0059178 A1 | 3/2010 | Jiang et al. |
| 2010/0132886 A1 | 6/2010 | Rodriguez et al. |
| 2010/0305259 A1 | 12/2010 | Rodriguez et al. |
| 2011/0054117 A1 | 3/2011 | Hall et al. |
| 2011/0076905 A1 | 3/2011 | Mussig et al. |
| 2011/0229729 A2 | 9/2011 | Laiho et al. |
| 2012/0171466 A1 | 7/2012 | Urbach et al. |
| 2012/0329929 A1* | 12/2012 | Miller et al. .......... 524/275 |

FOREIGN PATENT DOCUMENTS

| | | |
|---|---|---|
| WO | WO-98/03603 | 1/1998 |
| WO | WO-98/42780 | 10/1998 |
| WO | WO-99/20664 | 4/1999 |
| WO | WO-99/20701 | 4/1999 |
| WO | WO-00/00520 | 1/2000 |
| WO | WO-00/01745 | 1/2000 |
| WO | WO-00/37514 | 6/2000 |
| WO | WO-01/46278 | 6/2001 |
| WO | WO-03/033612 | 4/2003 |
| WO | WO-2005/100501 | 10/2005 |
| WO | WO-2005/105941 | 11/2005 |
| WO | WO-2005/111132 | 11/2005 |
| WO | WO-2006/069205 | 6/2006 |
| WO | WO-2007/002177 | 4/2007 |
| WO | WO-2007/142749 | 12/2007 |
| WO | WO-2010/132886 | 11/2010 |
| WO | WO-2011/059431 | 5/2011 |
| WO | WO-2012/068576 | 7/2012 |
| WO | WO2013/003197 | 1/2013 |

OTHER PUBLICATIONS

Honeywell A-C 596A, 596P Propylene Maleic Anhydride Copolymer product data sheet (Jan. 2008) (1 page).

Rextac MSDS RT2765 CS212 (Feb. 14, 2011) (7 pages).

Westlake Chemical Corporation, product data sheet entitled, "Typical Properties of Epolene Polymers," Apr. 2009 (1 page).

* cited by examiner

REACTION PRODUCT OF PROPYLENE POLYMER AND WAX, GRAFT COPOLYMERS DERIVED FROM POLYPROPYLENE POLYMER AND WAX, HOT MELT ADHESIVE COMPOSITIONS INCLUDING THE SAME, AND METHODS OF USING AND MAKING THE SAME

BACKGROUND

The invention relates to reacting propylene polymer and wax in the presence of a free radical initiator.

Hot melt adhesive compositions are used in a variety of applications that require bonding two substrates together including, packaging applications (e.g., corrugated board and cardboard), nonwoven applications (e.g., disposable articles), bookbinding, and footwear manufacturing. A hot melt adhesive composition is generally applied in a molten state and forms a bond as it cools and solidifies. It is important that adhesives used in packaging applications exhibit good bond strength over a wide temperature range and fast set times. It is often difficult to achieve a hot melt adhesive composition that exhibits good bonding properties at both low and high temperatures.

Hot melt adhesive compositions that are formulated with amorphous polypropylene polymers are useful in a variety of applications. Many amorphous polypropylene polymers exhibit a long open time, are quite tacky immediately after solidifying from a molten state, and remain tacky for an undesirable period of time after solidifying. These properties are undesirable for applications that require short open times and non-tacky properties after solidification.

SUMMARY

In one aspect the invention features a propylene-wax copolymer that includes the reaction product of components that include a first polymer that includes at least one of polypropylene homopolymer and polypropylene-alpha-olefin copolymer, a first wax that includes at least one of polyethylene wax and Fischer Tropsch wax, and a free radical initiator, and that are free of an unsaturated compound that includes at least one functional group and having a molecular weight no greater than 1000 g/mole, the reaction product having a polydispersity index of no greater than 5 and a viscosity of no greater than 12,000 centipoise at 177° C.

In another aspect the invention features a propylene-wax copolymer that includes the reaction product of components that include a first polymer that includes at least one of polypropylene homopolymer and polypropylene-alpha-olefin copolymer, a first wax that includes polyethylene wax, and a free radical initiator, the reaction product having a number average molecular weight greater than 5000 g/mole, a polydispersity index no greater than 5, and a viscosity of no greater than 12,000 centipoise at 177° C. In one embodiment, the components further include an unsaturated compound that includes at least one functional group. In some embodiments, the unsaturated compound includes at least one of maleic acid, maleic anhydride, and fumaric acid.

In some aspects, the invention features a propylene-wax copolymer that includes the reaction product of components that include a first polymer having a polydispersity index of no greater than 5 and including at least one of polypropylene homopolymer and polypropylene-alpha-olefin copolymer, a first wax that includes at least one of polyethylene wax, Fischer Tropsch wax, and paraffin wax, a free radical initiator, and that are free of an unsaturated compound that includes at least one functional group and having a molecular weight no greater than 1000 g/mole, the reaction product exhibiting a viscosity of no greater than 12,000 centipoise at 177° C.

In other aspects, the invention features a method of making a graft copolymer, the method including blending a first polymer and a first wax in the presence of a free radical initiator for a period of time and under sufficient conditions to achieve a reaction product having a polydispersity index of no greater than 5, the first polymer including at least one of polypropylene homopolymer and polypropylene-alpha-olefin copolymer, and the first wax including polyethylene wax.

In another aspect, the invention features a method of making a graft copolymer includes blending a first polymer and a first wax in the presence of a free radical initiator and in the absence of an unsaturated compound that includes at least one functional group and has a molecular weight no greater than 1000 g/mole for a period of time and under sufficient conditions to achieve a reaction product having a polydispersity index of no greater than 5, the first polymer including at least one of polypropylene homopolymer and polypropylene-alpha-olefin copolymer, and the first wax including at least one of polyethylene wax and Fischer Tropsch wax.

In another aspect, the invention features a hot melt adhesive composition that includes a propylene-wax copolymer described herein. In some embodiments, hot melt adhesive composition further includes at least one of a tackifying agent, a plasticizer, and a wax.

In one aspect, the invention features a hot melt adhesive composition that includes a) a reaction product of components that include a first polymer that includes at least one of polypropylene homopolymer and polypropylene-alpha-olefin copolymer, a first wax that includes at least one of polyethylene wax and Fischer Tropsch wax, a free radical initiator, and that are free of an unsaturated compound that includes at least one functional group and having a molecular weight no greater than 1000 g/mole, the reaction product having a number average molecular weight greater than 0.5000 g/mole, a polydispersity index of no greater than 5, and a viscosity of no greater than 12,000 centipoise at 177° C., and b) a tackifying agent. In one embodiment, the hot melt adhesive composition further includes a second wax. In another embodiment, the first polymer has a polydispersity index of less than 5. In some embodiments, first polymer has a polydispersity index of less than 4.5. In other embodiments, the reaction product has a polydispersity index of no greater than 4.5. In another embodiment, the reaction product has a polydispersity index of no greater than 4.

In some embodiments, the first polymer includes a polypropylene homopolymer.

In one embodiment, the first wax is a non-functionalized wax. In another embodiment, the first wax includes polyethylene wax and Fischer Tropsch wax. In other embodiments, the second wax includes at least one of polyethylene wax, polypropylene wax, Fischer Tropsch wax, paraffin, and functionalized wax. In some embodiments, the second wax includes at least one of maleated polypropylene wax and maleated polyethylene wax.

In one embodiment, the first polymer includes polypropylene homopolymer and the first wax includes polyethylene. In another embodiment, the first polymer includes polypropylene homopolymer and the first wax includes a Fischer Tropsch wax.

In other embodiments, the hot melt adhesive compositions described herein include from about 30% by weight to about 80% by weight of the reaction product, from about 1% by weight to about 40% by weight of the tackifying agent, and from about 1% by weight to about 35% by weight of the second wax. In another embodiment, the hot melt adhesive compositions described herein include from about 35% by weight to about 70% by weight of the reaction product, and from about 5% by weight to about 35% by weight of the tackifying agent.

In some embodiments, the hot melt adhesive composition exhibits a fiber tearing bond at −29° C. and at 60° C. In other embodiments, the hot melt adhesive composition exhibits at least about 50% fiber tear at −29° C. and at 60° C. In one embodiment, the hot melt adhesive composition exhibits at least 80% fiber tear at 71° C.

In another embodiment, the hot melt adhesive composition exhibits an initial Gardner color of no greater than 3.

In other embodiments, the hot melt adhesive composition exhibits a change in viscosity of no greater than 10% after aging for 96 hours at 177° C.

In some embodiments, the hot melt adhesive composition is free of gelling after aging for 96 hours at 177° C.

In one embodiment, the composition exhibits a set time of no greater than 10 seconds. In another embodiment, the composition exhibits a set time of no greater than 5 seconds.

In some embodiments, the composition exhibits an energy to break of at least 0.15 Joules. In one embodiment, the composition exhibits a strain at break of at least about 100%. In other embodiments, the composition exhibits an energy to break of at least 0.15 Joules and a strain at break of at least 100%. In another embodiment, the composition exhibits a heat stress resistance of at least 60° C. In one embodiment, the composition exhibits an energy to break of at least 0.15 Joules and a heat stress resistance of at least 60° C.

In another embodiment, the composition exhibits an energy to break of at least 0.15 Joules and a strain at break of at least 100%, and further includes a second wax selected from the group consisting of polyethylene wax, polypropylene wax, Fischer Tropsch wax, paraffin, maleated polypropylene wax, and maleated polyethylene wax.

In other embodiments, the composition exhibits an energy to break of at least 0.15 Joules and a heat stress resistance of at least 60° C., and further includes a second wax selected from the group consisting of polyethylene wax, polypropylene wax, Fischer Tropsch wax, paraffin, maleated polypropylene wax, and maleated polyethylene wax.

In another embodiment, the composition exhibits a tensile strength of at least 1.38 MPa.

In one embodiment, wherein the composition includes at least 10% by weight tackifying agent and exhibits at least about 75% fiber tear at −29° C.

In other embodiments, the reaction products disclosed herein include the reaction product of the first polymer, the first wax, the free radical initiator, and an unsaturated compound that includes at least one functional group. In one embodiment, the unsaturated compound includes at least one of maleic acid, maleic anhydride, and fumaric acid.

In another embodiment, the reaction products disclosed herein include the reaction product of the first polymer, the first wax, the first wax being a non-functionalized wax, the free radical initiator, and a second wax, the second wax being a functionalized wax.

In some embodiments, the hot melt adhesive compositions described herein further include a nucleating agent.

In another aspect, the invention features an article that includes a first substrate, a hot melt adhesive composition disclosed herein, and a second substrate bonded to the first substrate through the hot melt adhesive composition. In one embodiment, the first substrate includes cardboard.

In other aspects, the invention features a method of using the hot melt adhesive compositions disclosed herein, the method including contacting a first substrate that includes fibers with a hot melt adhesive composition disclosed herein, and bonding a second substrate that includes fibers to the first substrate through the hot melt adhesive composition such that the hot melt adhesive composition forms a fiber tearing bond to the first substrate in no greater than 10 seconds. In some embodiments, the hot melt adhesive composition exhibits a fiber tearing bond to the first substrate in no greater than 5 seconds.

In another aspect, the invention features a hot melt adhesive composition that includes a reaction product of components that include a first polymer that includes at least one of polypropylene homopolymer and polypropylene-alpha-olefin copolymer, a first wax that includes at least one of polyethylene wax, Fischer Tropsch wax, and paraffin wax, and a free radical initiator, the reaction product having a viscosity at 177° C. that is less than the viscosity of a blend of the components of the reaction product other than the free radical initiator, the reaction product having a number average molecular weight greater than 5000 g/mole, a polydispersity index of no greater than 5, and a viscosity of no greater than 12,000 centipoise at 177° C. In one embodiment, the reaction product has a viscosity at 177° C. that is at least 20% less than the viscosity at 177° C. of the blend of the components of the reaction product other than the free radical initiator. In some embodiments, the hot melt adhesive composition further includes a tackifying agent.

In other aspects, the invention features a hot melt adhesive composition that includes a reaction product of a first polymer that includes at least one of polypropylene homopolymer and polypropylene-alpha-olefin copolymer, a first non-functionalized wax that includes at least one of polyethylene wax, Fischer Tropsch wax, and paraffin wax, and a free radical initiator, and a tackifying agent, the reaction product exhibiting a viscosity of no greater than 12,000 centipoise at 177° C., and the hot melt adhesive composition exhibiting at least one of an energy to break of at least 0.15 Joules, a tensile strength of at least 3.28 MPa, and a heat stress resistance of at least 65° C.

In some aspects, the invention features a hot melt adhesive composition that includes the reaction product of components that include a first polymer having a polydispersity index of no greater than 5 and including at least one of polypropylene homopolymer and polypropylene-alpha-olefin copolymer, a first wax that includes at least one of polyethylene wax, Fischer Tropsch wax, and paraffin wax, a free radical initiator, and being free of an unsaturated compound that includes at least one functional group and that has a molecular weight no greater than 1000 g/mole, the reaction product exhibiting a viscosity of no greater than 12,000 centipoise at 177° C.

In yet other aspects, the invention features a hot melt adhesive composition that includes the reaction product of a first polymer that includes at least one of polypropylene homopolymer and polypropylene-alpha-olefin copolymer, a first wax that includes polyethylene wax, and a free radical initiator, the reaction product having a number average molecular weight greater than 5000 g/mole, a polydispersity index no greater than 5, and a viscosity of no greater than 12,000 centipoise at 177° C.

The hot melt adhesive exhibits good bond strength over a wide temperature range and good adhesion to packaging materials.

Other features and advantages will be apparent from the following description of the preferred embodiments and from the claims.

GLOSSARY

In reference to the invention, these terms have the meanings set forth below:

The term "wax" means a polymer having crystallinity and a weight average molecular weight (Mw) less than 20,000 g/mole.

The term "non-functionalized wax" refers to a wax that is free of polar functional groups.

DETAILED DESCRIPTION

Hot Melt Adhesive Composition

The hot melt adhesive composition includes a reaction product of a propylene polymer, a wax, and a free radical initiator. The hot melt adhesive composition exhibits a viscosity of no greater than about 5,000 centipoise (cP), no greater than about 4,000 cP, no greater than about 3,500 cP, no greater than about 3,000 cP, no greater than about 2,500 cP, or even no greater than about 2,000 cP, at 177° C. The hot melt adhesive composition preferably forms a fiber tearing bond at −29° C. and at 60° C., and preferably exhibits at least about 40%, at least about 50%, at least about 75%, at least about 80%, at least about 90%, or even at least 100% fiber tear at −29° C. and at 60° C., at 65° C., at 71° C., at 75° C., or even at 77° C.

The hot melt adhesive composition also exhibits a set time of no greater than 15 seconds, no greater than 10 seconds, no greater than 8.5 seconds, no greater than 7 seconds, or even no greater than 5 seconds.

The hot melt adhesive composition preferably exhibits at least one of a strain at break of at least 10%, at least about 50%, at least about 75%, at least about 100%, or at least even about 120%, a tensile strength of at least 1.38 megapascals (MPa) (200 pounds per square inch (psi)), at least about 1.72 MPa (250 psi), at least about 2.07 MPa (300 psi), at least about 2.41 MPa (350 psi), at least about 2.76 MPa (400 psi), at least about 3.26 MPa (475 psi), at least about 3.45 MPa (500 psi) at least 4.14 MPa (600 psi) or even at least 4.48 MPa (650 psi), and an energy to break of at least 0.15 Joules (J), at least about 0.20 J, of at least about 0.25 J, or even at least about 0.40 J.

The hot melt adhesive composition also preferably exhibits a heat stress resistance of at least 55° C., at least 60° C., at least 65° C., or even at least 70° C.

The hot melt adhesive composition also preferably exhibits an initial Gardner color of no greater than 5, no greater than 4, or even no greater than 3, a Gardner color of no greater than 11 or even no greater than 7 after aging for 96 hours at 177° C., or even a change in Gardner color of no greater than 9, of no greater than 7, or even of no greater than 5 after aging for 96 hours at 177° C. The hot melt adhesive composition preferably is free of gelling after aging for 96 hours at 177° C. and preferably exhibits a change in viscosity of no greater than about 20% or even no greater than about 10% after aging for 96 hours at 177° C.

Reaction Product

The reaction product is derived from a propylene polymer that is at least one of a polypropylene homopolymer and a propylene-alpha-olefin copolymer, a first wax that is at least one of polyethylene wax, Fischer Tropsch wax, and paraffin wax, and a free radical initiator. The reaction product includes a copolymer that includes units of the propylene polymer and units of the first wax, and optionally at least one of the propylene polymer and the first wax.

The reaction product preferably has a polydispersity index (Mw/Mn) of no greater than 5.5, no greater than about 5.0, no greater than about 4.5, no greater than about 4.0, or even no greater than about 3, and a viscosity of no greater than about 12,000 cP, no greater than about 10,000 cP, no greater than about 5000 cP, no greater than about 4000 cP, no greater than about 3500 cP, no greater than about 3000 cP, or even no greater than about 2500 cP, at 177° C. Useful reaction products exhibit a number average molecular weight (Mn) of at least 5000 grams/mole (g/mole), at least about 5500 g/mole, at least about 6000 g/mole or even at least about 6500 g/mole.

The reaction product can exhibit a viscosity that is less than the viscosity of a blend of the components from which the reaction product is derived (other than the free radical initiator). The reaction product can exhibit a viscosity that is at least 10%, at least about 20%, at least about 30%, at least about 40%, at least about 60%, at least about 70%, or even at least about 80% less than the viscosity of the blend from which the reaction product is derived.

The reaction product can exhibit at least one of the properties of the hot melt adhesive composition. Alternatively or in addition, the reaction product can be formulated with other components to exhibit at least one of the properties of the hot melt adhesive composition. The reaction product preferably is present in the hot melt adhesive composition in an amount of about 100% by weight, at least 30% by weight, at least about 35% by weight, at least about 40% by weight, no greater than 99% by weight, no greater than about 90% by weight, from about 30% by weight to about 80% by weight, from about 35% by weight to about 70% by weight, or even from about 40% by weight to about 60% by weight.

Propylene Polymer

Useful propylene polymers from which the reaction product can be derived have a polydispersity index (Mw/Mn) of no greater than about 5, no greater than about 4.5, no greater than about 4, or even no greater than about 3. The propylene polymer preferably exhibits a viscosity of no greater than 20,000 cP, no greater than 15,000 cP, or even no greater than 10,000 cP, at 190° C.

Useful propylene polymers include, e.g., polypropylene homopolymers, copolymers (i.e., copolymers, terpolymers, and higher order polymers) of propylene and at least one alpha-olefin co-monomer, and combinations thereof. Useful propylene copolymers are derived from propylene and at least one alpha-olefin co-monomer (e.g., alpha-olefin monomers having at least two carbon atoms, at least four carbon atoms, and combinations of such monomers). Useful alpha-olefin monomers include, e.g., ethylene, butene, pentene, hexene, heptene, octene, nonene, decene, dodecene, 4-methyl-pentene-1,3-methyl pentene-1,3,5,5-trimethyl-hexene-1,5-ethyl-1-nonene, and combinations thereof. Suitable alpha-olefin co-monomers include mono-alpha olefins (i.e., one unsaturated double bond) and higher order olefins (e.g., a di-olefin, e.g., 1,9-decadiene). Specific examples of suitable propylene-alpha-olefin copolymers include propylene-ethylene, propylene-butene, propylene-hexane, propylene-octene, and combinations thereof.

The propylene polymer preferably includes at least 50 mole %, at least about 60 mole %, at least about 70 mole %, at least about 80 mole %, at least about 90 mole %, at least about 95 mole %, or even from about 50 mole % to about 100 mole % propylene.

The propylene polymer optionally includes at least 2 mole %, at least about 5 mole %, at least about 10 mole %, at least about 20 mole %, at least about 30 mole %, no greater than about 50 mole %, or even from about 20 mole % to about 50 mole % of at least one alpha-olefin co-monomer.

Useful propylene polymers include metallocene-catalyzed propylene polymers. Suitable propylene polymers are commercially available under a variety of trade designations including, e.g., the L-MODU series of trade designations from Idemitsu Kosan Co., Ltd (Japan) including, e.g., L-MODU 5400, 5600, and 5901, the VISTAMAXX series of trade designations from ExxonMobil Chemical Company (Houston, Tex.) including, e.g., VISTAMAXX 6202 and 2330, and the LICOCENE series of trade designations from Clariant Int'l Ltd. (Muttenz, Switzerland) including, e.g., LICOCENE PP 1602 TP and PP 2602 TP.

The reaction product preferably is formed from at least at least 60% by weight, at least 70% by weight, at least 80% by weight, from about 70% by weight to about 99% by weight, from about 80% by weight to about 95% by weight, or even from about 85% by weight to about 95% by weight propylene polymer.

Wax

Useful waxes from which the reaction product can be derived include, e.g., polyethylene waxes (e.g., polyethylene homopolymers), Fischer Tropsch waxes, paraffin waxes, and combinations thereof, alone or in further combination with polypropylene wax. The wax preferably is non-functionalized.

Useful polyethylene waxes are commercially available under a variety of trade designations including, e.g., the EPOLENE series of trade designations from Westlake Chemical Corporation (Houston, Tex.) including, e.g., EPOLENE N-21 and N-14 polyethylene waxes, the BARECO series of trade designations from Baker Hughes Inc. (Sugar Land, Tex.) including, e.g., BARECO C4040 polyethylene wax, and the AC series of trade designations from Honeywell Int'l Inc. (Morristown, N.J.) including, e.g., A-C 8 and A-C 9 polyethylene waxes.

Useful Fischer Tropsch waxes are commercially available under a variety of trade designations including, e.g., the BARECO series of trade designations from Baker Hughes Inc. (Sugar Land, Tex.) including, e.g., BARECO PX-100 and PX-105 Fischer Tropsch waxes, the SHELLWAX series of trade designations from Shell Malaysia Ltd. (Kuala Lumpur, Malaysia) including, e.g., SHELLWAX SX100 and SX105 Fischer Tropsch waxes, the VESTOWAX series of trade designations from Evonik Industries AG (Germany) including, e.g., VESTOWAX 2050 Fischer Tropsch wax, and the SASOLWAX series of trade designations from Sasol Wax North America Corporation (Hayward, Calif.) including, e.g., SASOLWAX H105, C80, H1, and H4 Fischer Tropsch waxes.

Useful paraffin waxes are available under a variety of trade designations including, e.g., PARVAN 1580 and 1520 paraffin waxes from ExxonMobil Chemical Company (Houston, Tex.).

Useful polypropylene waxes are commercially available under a variety of trade designations including, e.g., EPOLENE N15 from Westlake Chemical Corporation (Houston, Tex.), HONEYWELL AC1089 from Honeywell Int'l Inc. (Morristown, N.J.), and LICOCENE 6102 from Clariant Int'l Ltd. (Muttenz, Switzerland).

The reaction product preferably is formed from about 1% by weight to about 40% by weight, from about 3% by weight to about 30% by weight, from about 5% by weight to about 25% by weight, or even from about 7% by weight to about 15% by weight wax.

Free Radical Initiator

Useful free-radical initiators include, e.g., peroxide-type compounds, azo-type compounds, and mixtures thereof. Examples of suitable peroxide-type compounds include diacyl peroxides, peroxy esters, peroxy ketals, di-alkyl peroxides, and hydroperoxides, specifically hydrogen peroxide, benzoyl peroxide, decanoyl peroxide, lauroyl peroxide, succinic acid peroxide, cumene hydroperoxide, t-butylhydroperoxide, t-butyl peroxy acetate, 2,2-di(t-butyl peroxy) butane di-allyl peroxide, 2,5-dimethyl-2,5-di(t-butyl peroxy) hexane, cumyl peroxide, di-t-amyl peroxide, and combinations thereof. Suitable 2,5-dimethyl-2,5-di(t-butyl peroxy) hexanes are commercially available from United Initiator Incorporated (Elyria, Ohio).

Examples of suitable azo-type compounds include azobisisobutyronitrile (AIBN), 2,2'-azobis(N,N-dimethyleneisobutyramide)dihydrochloride (one example of which is commercially available under the VA-044 trade designation from Wako Chemical Co.), 2,2'-azobis(2,4-dimethyl valeronitrile) (one example of which is commercially available under the V-65 trade designation from Wako Chemical Co.), VAZO 64 2,2-azobis(isobutyronitrile) and VAZO 67 2,2'-azobis(2-methylbutyronitrile) both of which are commercially available from du Pont de Nemours and Company (Wilmington, Del.), 1,1'-azobis(1-cyclohexane carbonitrile), acid-functional azo-type initiators e.g., 4,4'-azobis(4-cyanopentanoic acid), and combinations thereof.

The reaction product preferably is formed from about 0.005% by weight to about 10% by weight, from about 0.1% by weight to about 5% by weight, or even from about 0.2% by weight to about 2% by weight free-radical initiator based on the weight of the propylene polymer.

Optional Functional Unsaturated Compound

The blend from which the reaction product is derived can be free of an unsaturated compound that includes at least one functional group (i.e., a functional unsaturated compound) and that has a molecular weight greater than 1000 g/mole. Alternatively, the reaction product optionally is derived from an unsaturated compound, a functional unsaturated compound, and combinations thereof. Useful functional groups include, e.g., acids, anhydrides, esters, hydroxyl, amides, epoxy, and combinations thereof. Useful functional unsaturated compounds include, e.g., unsaturated acids, polyacids, polyanhydrides, and combinations thereof. Examples of suitable unsaturated acids include acrylic acid and methacrylic acid. Examples of suitable unsaturated polyacids and unsaturated polyanhydrides include dicarboxylic acids and tricarboxylic acids including, e.g., acids and anhydrides of aliphatic dicarboxylic acids (e.g. maleic acid, maleic anhydride, and fumaric acid), and combinations thereof.

The reaction product can be derived from 0% by weight to no greater than about 7% by weight, no greater than about 0.01% by weight, no greater than 0.001% by weight, from about 0.1% by weight to about 3% by weight, or even from about 0.1% by weight to about 2% by weight of a functional unsaturated compound, where the % by weight is based on the weight of the reaction product.

Reaction Process

The reaction product preferably is prepared by combining the propylene polymer, wax, and free radical initiator (and any optional components) to form a reaction mixture and reacting the same at an elevated temperature (e.g., from about 150° C. to about 250 CC, or even from about 175° C. to about 225° C.) under a blanket of inert gas (e.g., nitrogen). The peroxide or agent is dispersed in the reaction mixture and the temperature of the process is at least as high as the melting point of the polymer. The temperature preferably is sufficiently far above the melting point to obtain reasonably good agitation of the polymer. Useful processing temperatures include from about 100° C. to about 250° C., from about 150° C. to about 220° C., or even from about 170° C. to about 190° C. The temperature of the process preferably is initially from about 10° C. to about 100° C. above the softening point of the polymer or polymer mixture to be treated. The reaction time may vary from less than a minute to several hours depending on the temperature used and the half-life of the free radical initiator being used.

The process can be carried out using any suitable method including, e.g., continuous processes, semi-continuous processes, and batch processes. Suitable continuous processes include, e.g., processes that use extruders (e.g., single screw, twin screw, disk screw, reciprocating single screw, and pin barrel single screw) and processes that use tandem extrusion techniques. Suitable batch processes include, e.g., processes that utilize reaction vessels. Suitable reaction vessels include those made from glass or metal. For example, the reactions may be conducted in glass flasks, glass lined reactors, steel autoclaves, extruders, Brabender plastographs, and Banbury mixers. The reactions may be conducted in the presence of air or under inert gases such as nitrogen. Although not required, it is also possible to carry out the treatment in the presence of an inert solvent such as benzene. Optionally a vacuum is applied to remove impurities and volatile by-products of the reaction process.

Tackifying Agent

The hot melt adhesive composition optionally includes a tackifying agent. Tackifying agents suitable for use in the adhesive composition preferably have Ring and Ball softening point of less than about 160° C., less than about 150° C., or even less than about 140° C. Suitable classes of tackifying agents include, e.g., aromatic, aliphatic and cycloaliphatic hydrocarbon resins, mixed aromatic and aliphatic modified hydrocarbon resins, aromatic modified aliphatic hydrocarbon resins, and hydrogenated versions thereof; terpenes, modified terpenes and hydrogenated versions thereof; natural rosins, modified rosins, rosin esters, and hydrogenated versions thereof; low molecular weight polylactic acid; and combinations thereof. Examples of useful natural and modified rosins include gum rosin, wood rosin, tall oil rosin, distilled rosin, hydrogenated rosin, dimerized rosin, and polymerized rosin. Examples of useful rosin esters include e.g., glycerol esters of pale wood rosin, glycerol esters of hydrogenated rosin, glycerol esters of polymerized rosin, pentaerythritol esters of natural and modified rosins including pentaerythritol esters of pale wood rosin, pentaerythritol esters of hydrogenated rosin, pentaerythritol esters of tall oil rosin, phenolic-modified pentaerythritol esters of rosin, and combinations thereof. Examples of useful polyterpene resins include polyterpene resins having a softening point, as determined by ASTM method E28-58T, of from about 10° C. to about 160° C., hydrogenated polyterpene resins, and copolymers and terpolymers of natural terpenes (e.g. styrene-terpene, alpha-methyl styrene-terpene and vinyl toluene-terpene), and combinations thereof. Examples of useful aliphatic and cycloaliphatic petroleum hydrocarbon resins include aliphatic and cycloaliphatic petroleum hydrocarbon resins having Ring and Ball softening points of from about 10° C. to 160° C., the hydrogenated derivatives thereof, and combinations thereof. Suitable aliphatic and cycloaliphatic petroleum hydrocarbon resins include, e.g., branched, unbranched, and cyclic C5 resins, C9 resins, and C10 resins.

Useful tackifying agents are commercially available under a variety of trade designations including, e.g., the ESCOREZ series of trade designations from ExxonMobil Chemical Company (Houston, Tex.) including, e.g., ESCOREZ 5400, ESCOREZ 5415, ESCOREZ 5600, ESCOREZ 5615, and ESCOREZ 5690, the EASTOTAC series of trade designations from Eastman Chemical (Kingsport, Tenn.) including, e.g., EASTOTAC H-100R, EASTOTAC H-100L, EASTOTAC H 130W, and EASTOTAC H142, the WINGTACK series of trade designations from Cray Valley HSC (Exton, Pa.) including, e.g., WINGTACK 86, WINGTACK EXTRA, and WINGTACK 95, the PICCOTAC series of trade designations from Eastman Chemical Company (Kingsport, Tenn.) including, e.g., PICCOTAC 8095, the ARKON series of trade designations from Arkawa Europe GmbH (Germany) including, e.g., ARKON P-125, and under the REGALITE series of trade designations from Eastman Chemical Company including, e.g., REGALITE R1125.

The adhesive composition preferably includes no greater than about 50% by weight, no greater than about 40% by weight, no greater than about 30% by weight, no greater than about 20% by weight, no greater than about 10% by weight, no greater than about 5% by weight, at least about 1% by weight, at least about 15% by weight, at least about 20% by weight, from about 1% by weight to about 40% by weight, from about 5% by weight to about 35% by weight, or even from about 10% by weight to about 35% by weight tackifying agent.

Other Components

The hot melt adhesive composition optionally includes a variety of additional components including, e.g., wax, antioxidants, stabilizers, additional polymers, plasticizers, oil (e.g., aliphatic napthenic oil, white oil, and combinations thereof), adhesion promoters, ultraviolet light stabilizers, rheology modifiers, biocides, corrosion inhibitors, dehydrators, colorants (e.g., pigments and dyes), fillers, surfactants, flame retardants, nucleating agents, and combinations thereof.

Classes of useful waxes include, e.g., functionalized waxes, non-functionalized waxes, and mixtures thereof. Useful functionalized waxes include, e.g., functionalized polyethylene wax (e.g., maleated polyethylene wax and oxidized polyethylene wax), functionalized polypropylene wax (e.g., maleated polypropylene wax and oxidized polypropylene wax), polar waxes, functionalized stearamide waxes (e.g., hydroxystearamide, N-(2-hydroxy ethyl)-12-hydroxystearamide, N,N'-ethylene bis 12-hydroxystearamide, and 12-hydroxy stearic acid N,N' ethylene-bis stearamide), and combinations thereof. Useful non-functionalized waxes include, e.g., Fischer Tropsch waxes, polyolefin waxes (e.g., polypropylene waxes and polyethylene waxes), stearamide waxes, benzoate ester waxes, animal waxes, vegetable waxes, paraffin waxes, microcrystalline waxes, metallocene waxes, glycerin monostearate, sorbitan monostearate, and combinations thereof.

Useful commercially available functionalized waxes include, e.g., A-C 597P and A-C 596P maleated polypropylene wax, which are available from Honeywell International Inc.

Useful commercially available non-functionalized waxes include the waxes set forth above in the discussion of waxes from which the reaction product is derived.

The additional wax, when present in the hot melt adhesive composition, is preferably present in an amount of at least 0.2% by weight, at least 2% by weight, at least about 5% by weight, at least about 10% by weight, no greater than about 35% by weight, no greater than about 30% by weight, no greater than about 25% by weight, from about 5% by weight to about 25% by weight, or even from about 5% by weight to about 20% by weight.

Useful antioxidants include, e.g., pentaerythritol tetrakis [3,(3,5-di-tert-butyl-4-hydroxyphenyl)propionate], 2,2'-methylene bis(4-methyl-6-tert-butylphenol), phosphites including, e.g., tris-(p-nonylphenyl)-phosphite (TNPP) and bis(2,4-di-tert-butylphenyl)4,4'-diphenylene-diphosphonite, di-stearyl-3,3'-thiodipropionate (DSTDP), and combinations thereof. Useful antioxidants are commercially available under a variety of trade designations including, e.g., the IRGANOX series of trade designations including, e.g., IRGANOX 1010, IRGANOX 565, and IRGANOX 1076 hindered phenolic antioxidants and IRGAFOS 168 phosphite antioxidant, all of which are available from BASF Corporation (Florham Park, N.J.), and ETHYL 702 4,4'-methylene bis(2,6-di-tert-butylphenol). When present, the adhesive composition preferably includes from about 0.1% by weight to about 2% by weight antioxidant.

Useful additional polymers include, e.g., homopolymers, copolymers, and terpolymers, thermoplastic polymers including, e.g., polyolefins (e.g., polyethylene, polypropylene, metallocene-catalyzed polyolefins, and combinations thereof), elastomers including, e.g., elastomeric block copolymers (e.g., styrene-butadiene-styrene, styrene-isoprene-styrene, styrene-ethylene/butene-styrene, styrene-ethylene/propylene-styrene, metallocene-based elastomeric block copolymers, and combinations thereof), and functionalized versions thereof, and combinations thereof. Examples of suitable commercially available polymers include, e.g., EPOLENE C-15 branched polyethylene, and EPOLENE C-10 branched polyethylene, which are available from Westlake Chemical Corporation (Houston, Tex.).

The optional polymer, when present in the hot melt adhesive composition, is preferably present in an amount no greater than about 10% by weight, no greater than about 5% by weight, no greater than about 3% by weight, or even from about 1% by weight to about 4% by weight.

Useful nucleating agents include, e.g., polymeric nucleating agents, minerals, amides, aromatic organic compounds, phosphate ester salts, organic salts and combinations thereof. Examples of suitable nucleating agents include polypropylene, polypropylene wax, polyethylene, polyethylene wax, polystyrene, poly(vinylcyclohexane), stearamides, anthraquinones, fatty acid amides, adipic acid, benzoic acid, benzoic acid salts, phosphate ester salts, sorbitols, kaolin, talc and combinations thereof. The nucleating agent preferably increases the set speed of at least one of the reaction product and the adhesive composition. Suitable nucleating agents are commercially available under a variety of trade designations including, e.g., N-15 polypropylene wax from Westlake Chemical Corporation (Houston, Tex.), and HYPERFORM HPN-68L disodium cis-endo-bicyclo(2.2.1) heptane-2-3-dicarboxylate from Milliken Chemical (Spartanburg, S.C.).

Uses

The reaction product can be applied on or incorporated in a variety of articles including, e.g., films (e.g., polyolefin films (e.g., polyethylene and polypropylene), polyester film, metalized polymer film, multi-layer film, and combinations thereof), fibers, substrates made from fibers (e.g., virgin fibers, recycled fibers, synthetic polymer fibers (e.g., nylon, rayon, polyesters, acrylics, polypropylenes, polyethylene, polyvinyl chloride, polyurethane), cellulose fibers (e.g., natural cellulose fibers such as wood pulp), natural fibers (e.g., cotton, silk and wool), and glass fibers, and combinations thereof), release liners, porous substrates, cellulose substrates, sheets (e.g., paper, and fiber sheets), paper products, woven and nonwoven webs (e.g., webs made from fibers (e.g., yarn, thread, filaments, microfibers, blown fibers, and spun fibers) perforated films, and combinations thereof), tape backings, and combinations thereof.

The hot melt adhesive composition is useful for bonding a variety of substrates including, e.g., cardboard, coated cardboard, paperboard, fiber board, virgin and recycled kraft, high and low density kraft, chipboard, treated and coated kraft and chipboard, and corrugated versions of the same, clay coated chipboard carton stock, composites, leather, polymer film (e.g., polyolefin films (e.g., polyethylene and polypropylene), polyvinylidene chloride films, ethylene vinyl acetate films, polyester films, metalized polymer film, multi-layer film, and combinations thereof), fibers and substrates made from fibers (e.g., virgin fibers, recycled fibers, synthetic polymer fibers, cellulose fibers, and combinations thereof), release liners, porous substrates (e.g., woven webs, nonwoven webs, and perforated films), cellulose substrates, sheets (e.g., paper, and fiber sheets), paper products, tape backings, and combinations thereof. Useful composites include, e.g., chipboard laminated to metal foil (e.g., aluminum foil), which optionally can be laminated to at least one layer of polymer film, chipboard bonded to film, Kraft bonded to film (e.g., polyethylene film), and combinations thereof.

The hot melt adhesive composition is useful in bonding a first substrate to a second substrate in a variety of applications and constructions including, e.g., packaging, bags, boxes, cartons, cases, trays, multi-wall bags, articles that include attachments (e.g., straws attached to drink boxes), ream wrap, cigarettes (e.g., plug wrap), filters (e.g., pleated filters and filter frames), bookbinding, footwear, disposable absorbent articles (e.g., disposable diapers, sanitary napkins, medical dressings (e.g., wound care products), bandages, surgical pads, drapes, gowns, and meat-packing products), paper products including, e.g., paper towels (e.g., multiple use towels), toilet paper, facial tissue, wipes, tissues, towels (e.g., paper towels), sheets, mattress covers, and components of absorbent articles including, e.g., an absorbent element, absorbent cores, impermeable layers (e.g., backsheets), tissue (e.g., wrapping tissue), acquisition layers and woven and nonwoven web layers (e.g., top sheets, absorbent tissue), and combinations thereof.

The hot melt adhesive composition is also useful in forming laminates of porous substrates and polymer films such as those used in the manufacture of disposable articles including, e.g., medical drapes, medical gowns, sheets, feminine hygiene articles, diapers, adult incontinence articles, absorbent pads (e.g., for animals (e.g., pet pads) and humans (e.g., bodies and corpses)), and combinations thereof.

The hot melt adhesive composition can be applied to a substrate in any useful form including, e.g., as fibers, as a coating (e.g., a continuous coatings and discontinuous coatings (e.g., random, pattern, and array)), as a bead, as a film (e.g., a continuous films and discontinuous films), and combinations thereof, using any suitable application method including, e.g., slot coating, spray coating (e.g., spiral spray, random spraying, and random fiberization (e.g., melt blowing)), foaming, extrusion (e.g., applying a bead, fine line extrusion, single screw extrusion, and twin screw extrusion), wheel application, noncontact coating, contacting coating, gravure, engraved roller, roll coating, transfer coating, screen printing, flexographic, and combinations thereof.

The invention will now be described by way of the following examples. All parts, ratios, percents, and amounts stated in the Examples are by weight unless otherwise specified.

EXAMPLES

Test Procedures

Test procedures used in the examples include the following. All ratios and percentages are by weight unless otherwise indicated. The procedures are conducted at room temperature (i.e., an ambient temperature of from about 20° C. to about 25° C.) unless otherwise specified.

Method for Determining Viscosity

Viscosity is determined in accordance with ASTM D-3236 entitled, "Standard Test Method for Apparent Viscosity of Hot Melt Adhesives and Coating Materials," (Oct. 31, 1988)

using a Brookfield Thermoset Viscometer Model RVDV 2+ and an appropriate spindle. The results are reported in centipoise ("cP").

Fiber Tear Test Method

The percentage fiber tear is the percentage of fiber that covers the area of the adhesive after two substrates, which have been previously bonded together through the adhesive, are separated by force. The percentage of fiber tear exhibited by an adhesive composition is determined as follows. A bead of the adhesive composition measuring 15.24 cm (6 inch)× 0.24 cm (3/32 inch) is applied to a first substrate of ROCKTENN 44 pound 87% virgin liner board, using a ROCKTENN bond simulator at the specified application temperature. Two seconds after the bead of adhesive is applied to the first substrate, the bead of adhesive is contacted with a second substrate of ROCKTENN 44 pound 87% virgin liner board, which is pressed against the adhesive and the first substrate with a pressure of 0.21 MPa (30 pounds per square inch (psi)) for a period of 2 seconds. The resulting constructions are then conditioned at room temperature for at least 4 hours and then conditioned at the specified test temperature for at least 12 hours. The substrates of the construction are then separated from one another by pulling the two substrates apart from one another by hand. The surface of the adhesive composition is observed and the percent of the surface area of the adhesive composition that is covered by fibers is determined and recorded. A minimum of five samples are prepared and tested for each hot melt adhesive composition. The results are reported in % fiber tear.

Set Time Test Method

A bead of adhesive composition measuring 15.24 cm (6 inch)×0.24 cm (3/32 inch) is applied to a first substrate of ROCKTENN 44 pound 87% virgin liner board, using a ROCKTENN bond simulator at the specified application temperature. 0.2 seconds after the bead of adhesive is applied to the first substrate, the bead of adhesive is contacted with a second substrate of ROCKTENN 44 pound 87% virgin liner board, which is pressed against the adhesive and the first substrate with a pressure of 0.21 Mpa (30 pounds per square inch (psi)) for a period of 0.2 seconds. A timer is started as the bead is applied to the first substrate. When the timer is at 3 seconds, the now formed bond is pulled apart. If the bond results in less than 100% fiber failure, another bond is made and pulled after 3.5 seconds. In this manner, the amount of time that is allowed to elapse prior to pulling the bond is increased in 0.5 second increments until the set time is arrived upon. The set time is the shortest amount of time in which a pulled bond results in 100% fiber failure. Once a set time is achieved, the test is repeated one more time to confirm the result. If the bond gives 100% fiber failure at 3 seconds, the set time is recorded as no greater than 3 seconds. The results are reported in seconds (s).

Heat Stress Resistance Test Method

Heat stress resistance is measured according to standard number IOPP T-3006 entitled, "Suggested Test Method for Determining the Heat Stress Resistance of Hot Melt Adhesives," using a starting temperature of 130° F. (54.4° C.) and five bonded samples per adhesive. The pass temperature for each adhesive, which is defined as the maximum temperature at which 80% of the samples remain bonded, is the heat stress resistance and is reported in degrees Celsius (° C.).

Tensile Test Method

Tensile properties are determined using ASTM D638 modified by the film thickness and aging time. Films of each sample are created by using a draw down square, which is preheated at 350° F. (177° C.), with a cut out of 40 mils, which when cooled provides a sample film thickness of 25 mils. Each sample is heated to 350° F. (177° C.), poured onto a Teflon board, and quickly drawn down using the square. Once cooled, the thickness of each film is measured using a micrometer. The target film thickness is 25 mils +/−5 mils, where 1 mil is equal to 0.001 inch. Tensile specimens are punched out of the film using a Type IV dog bone die. The thickness of the film specimen is not to vary by greater than 1 mil along the gauge length of a given specimen. Specimens are aged at room temperature for at least 12 hours prior to testing. The specimens are run on an INSTRON 4502 at 23° C., 50% relative humidity, and 2 inch/min extension rate. A calibrated 100 N INSTRON static load cell is used to quantify the force, and an INSTRON 2663-821 Advanced Video Extensometer, calibrated using a custom calibration bar, measures the change in the gage length. BLUE HILL 2 software is used for data acquisition and analysis.

Strain at break is calculated according to the portion of ASTM D638 pertaining to "percent elongation at break," and is reported in percent (%).

Maximum tensile strength is calculated according to the portion of ASTM D638 pertaining to "tensile strength," and is reported in megapascals (MPa).

Energy to break is calculated by integration of the stress-strain curve, and is reported in Joules (J).

Thermal Conditioning Procedure

A 200 gram (g) sample of hot melt composition is placed in a 400 milliliter (ml) PYREX glass beaker and held at 350° F. (177° C.) for periods of 24 hours, 48 hours, 72 hours, 96 hours, and 200 hours. An aliquot is removed from the sample for testing at each of the aforementioned time periods.

Gardner Color

A sample is conditioned according to the thermal conditioning procedure and then tested (in the molten state) to determine Gardner color by comparing the color of the sample against the Gardner Color Standards as set forth in ASTM D-1544. The comparison is made using a Gardner Delta Comparator equipped with an Illuminator available from Pacific Scientific (Bethesda, Md.). The result is reported as the number corresponding to the Gardner Color Standard.

Method for Determining Molecular Weight

Molecular weights (Mn, Mw, and Mz) are determined using a Polymer Labs PL-GPC 220 High Temperature Size Exclusion Chromatograph (HT-SEC) operating at 160° C. with 1,2,4-trichlorobenzene (TCB) as the mobile phase. The system contains three PL-gel mixed B columns in series and is equipped with a Refractive Index (RI) detector. The SEC operates at a flow rate of 1.0 ml/min with an injection volume of 100 μL All HT-SEC samples are prepared with a concentration of 4.0 mg/ml. Molecular weights are calculated from the Mark-Houwink relation using known polystyrene standards. For polystyrene the Mark-Houwink parameters are K=0.000121 and α=0.707; for polypropylene the Mark-Houwink parameters are, K=0.000190 and α=0.725. The results are reported in grams per mole (g/mole).

General Method for Preparing Reaction Products of the Examples

The polymer and wax are combined and heated to a temperature of from 175° C. to 180° C. with mixing. A peroxide, e.g., 92% 2,5-dimethyl-2,5-di(tertbutylperoxy)hexane (United Initiator Incorporated, Elyria, Ohio), is then added, under nitrogen atmosphere, to the molten polymer and wax mixture in 4 or 5 portions over a period of from 30 minutes to 45 minutes with mixing. After addition of the peroxide, the mixture is further heated and stirred under nitrogen for another 45 minutes to 60 minutes. Vacuum is then applied by pulling a pressure of about 29 inches of mercury (Hg) for 30 minutes, and the reaction product is recovered.

Control C1

Control C1 was L-MODU S400 polypropylene (Idemitsu Kosan Co., Ltd, Japan).

Examples 1-7

The reaction products of Examples 1-7 were prepared by combining 90% by weight L-MODU S400 polypropylene (Idemitsu) and 10% by weight wax of the type specified in Table 1 and heating the same to from 175° C. to 180° C., with mixing, to achieve a molten liquid. The molten liquid was then treated with 92% 2,5-dimethyl-2,5-di(tertbutylperoxy)hexane (United Initiator Incorporated, Elyria, Ohio), in the amount specified (in % by weight) in Table 1, under nitrogen atmosphere.

The reaction products of Examples 1-7 were tested according to the Viscosity Test Method at 177° C., and the weight average molecular weight (Mw), number average molecular weight (Mn), and z average molecular weight (Mz) were determined according to the Method for Determining Molecular Weight. The polydispersity index (PDI) was calculated by dividing Mw by Mn. The results are reported in Table 1.

Control C2

Control C2 was LICOCENE 2602 propylene-ethylene copolymer (Clariant Intl Ltd., Muttenz, Switzerland).

Examples 8 and 9

The reaction products of Examples 8 and 9 were prepared by combining 90% by weight LICOCENE 2602 propylene-ethylene copolymer and 10% by weight wax of the type specified in Table 1 and heating the same to from 175° C. to 180° C., with mixing, to achieve a molten liquid. The molten liquid was then treated with 92% 2,5-dimethyl-2,5-di(tertbutylperoxy)hexane (United Initiator Incorporated), in the amount specified (in % by weight) in Table 1, under nitrogen atmosphere.

The reaction products of Examples 8 and 9 were tested according to the Viscosity Test Method at 177° C., and the weight average molecular weight (Mw), number average molecular weight (Mn), and z average molecular weight (Mz) were determined according to the Method for Determining Molecular Weight. The polydispersity index (PDI) was calculated by dividing Mw by Mn. The results are reported in Table 1.

TABLE 1

| Sample | C1 | C2 | 1 | 2 | 3 | 4 | 5 | 6 | 7 | 8 | 9 |
|---|---|---|---|---|---|---|---|---|---|---|---|
| Wax Type | NA | NA | N11 | N14 | N21 | N21 | N21 | PX105 | PX105 | N21 | PX105 |
| Peroxide (% by weight) | 0 | 0 | 0.71 | 0.71 | 0.71 | 0.58 | 0.89 | 0.58 | 0.71 | 0.58 | 0.58 |
| Viscosity at 177° C. (cp) | 12,000 | 5125 | 2760 | 2610 | 2430 | 3270 | 2040 | 2300 | 1655 | 1980 | 1200 |
| Mw (g/mole) | 47,800 | 28,400 | 30,800 | 30,400 | 29,500 | 32,100 | 29,000 | 31,900 | 27,000 | 28,700 | 25,300 |
| Mn (g/mole) | 19,900 | 7570 | 8130 | 7210 | 10,200 | 10,600 | 9220 | 6770 | 6350 | 6390 | 5330 |
| PDI | 2.4 | 3.76 | 3.79 | 4.22 | 2.9 | 3.03 | 3.2 | 4.71 | 4.25 | 4.5 | 4.7 |
| Mz (g/mole) | 75,000 | 55,000 | 53,100 | 50,900 | 48,600 | 52,600 | 48,800 | 58,200 | 46,700 | 50,600 | 46,600 |

NA = Not Applicable
N11 = EPOLENE N11 polyethylene wax (Westlake Chemical Corporation, Houston, Texas)
N14 = EPOLENE N14 polyethylene wax (Westlake)
N21 = EPOLENE N21 polyethylene wax (Westlake)
PX105 = BARECO Fischer Tropsch wax (Baker Hughes Inc., Sugar Land, Texas)

Controls C3 and C4 and Examples 10-18

A series of reaction products (C3, C4, and 10-18) were prepared according to the General Procedure for Preparing a Reaction Product with the exception that the components and the amounts thereof (in % by weight) used to form the reaction product were as set forth in Table 2 below.

The Mw, Mn, and Mz for C3 were determined to be 24200 g/mol, 4130 g/mol, and 51000 g/mol, respectively. The Mw, Mn, and Mz for C4 were determined to be 21,800 g/mol, 4300 g/mol, and 45,000 g/mol, respectively.

The polydispersity index of C3 and C4 was determined to be 5.87 and 5.07, respectively.

TABLE 2

| Sample | C3 | C4 | 10 | 11 | 12 | 13 | 14 | 15 | 16 | 17 | 18 |
|---|---|---|---|---|---|---|---|---|---|---|---|
| REXTAC 2765 | 95 | 95 | 0 | 0 | 0 | 0 | 0 | 0 | 0 | 0 | 0 |
| AC1783 | 5 | 0 | 0 | 0 | 0 | 0 | 0 | 0 | 0 | 0 | 0 |
| L-MODU S400 | 0 | 0 | 90 | 90 | 90 | 84 | 90 | 71.2 | 0 | 90 | 90 |
| LICOCENE 2602 | 0 | 0 | 0 | 0 | 0 | 0 | 0 | 0 | 90 | 0 | 0 |
| EPOLENE N14 | 0 | 0 | 10 | 10 | 0 | 0 | 0 | 8.0 | 0 | 0 | 0 |
| EPOLENE N21 | 0 | 5 | 0 | 0 | 10 | 0 | 0 | 17.3 | 10 | 0 | 0 |
| EPOLENE N15 | 0 | 0 | 0 | 0 | 0 | 7 | 0 | 0 | 0 | 0 | 0 |
| BARECO PX105 | 0 | 0 | 0 | 0 | 0 | 7 | 10 | 3.5 | 0 | 10 | 0 |

TABLE 2-continued

| Sample | C3 | C4 | 10 | 11 | 12 | 13 | 14 | 15 | 16 | 17 | 18 |
|---|---|---|---|---|---|---|---|---|---|---|---|
| PARVAN 1580 | 0 | 0 | 0 | 0 | 0 | 0 | 0 | 0 | 0 | 0 | 10 |
| DHBP peroxide | 1.09 | 1.7 | 1.07 | 0.80 | 1.12 | 0.83 | 0.88 | 0.71 | 0.58 | 0.58 | 0.71 |

REXTAC 2765 = propylene butene copolymer (Rextac LLC, Odessa, Texas)
AC1783 = A-C-X 1783 maleated linear low density polyethylene wax having an acid number of 4.5, a saponification value of 6.2, a viscosity at 140° C. of 60 centipoise, a penetration value of 0.5 dmm, a Mw of 8,650, a Mn of 1700, a Mz of 18,000, and a Mw/Mn of 5.08 (Honeywell International Inc., Morristown, New Jersey).
L-MODU S400 = Idemitsu Kosan Co., Ltd
LICOCENE 2602 propylene-ethylene copolymer
EPOLENE N14 = polyethylene wax
EPOLENE N21 = polyethylene wax
DHBP = 92% 2,5-dimethyl-2,5-di(tertbutylperoxy)hexane (United Initiator Incorporated, Elyria, Ohio)
BARECO PX105 = Fischer Tropsch wax
PARVAN 1580 = paraffin wax (Exxon Mobil Chemical Company, Houston, Texas)

Controls C5-C7 and Examples 19-27

Hot melt adhesive compositions were prepared by mixing, at 177° C. for approximately 20 minutes, the components in the amounts (in % by weight) set forth in Table 3. The row heading "Reaction Product" refers to the reaction products of Controls C3 and C4 and Examples 10-16 from Table 2.

The hot melt adhesive compositions of Controls C5-C7 and Examples 19-27 were tested according to the Viscosity test method at 177° C., the Fiber Tear test method at test temperatures −28.9° C., −17.8° C., 4.4° C., 60° C., 65.6° C., and 71.1° C., and the Heat Stress Resistance test method, and for Energy to Break, Strain at Break, and Tensile Strength according to the Tensile test method. The results are set forth below in Table 3.

TABLE 3

| Sample | C5 | C6 | C7 | 19 | 20 | 21 | 22 | 23 | 24 | 25 | 26 | 27 |
|---|---|---|---|---|---|---|---|---|---|---|---|---|
| Reaction Product | C3 | C3 | C4 | 10 | 11 | 12 | 13 | 14 | 15 | 16 | 17 | 18 |
| Amount of Reaction Product | 88.65 | 73.65 | 100 | 58 | 68 | 68 | 73 | 73 | 72 | 68 | 68 | 58 |
| EASTOTAC H130W | 0 | 15 | 0 | 15 | 15 | 15 | 15 | 15 | 22.5 | 15 | 15 | 15 |
| BARECO PX105 | 0 | 0 | 0 | 10 | 5 | 0 | 0 | 0 | 0 | 0 | 0 | 10 |
| EPOLENE N21 | 8.37 | 8.37 | 0 | 10 | 10 | 12.5 | 10 | 10 | 0 | 12.5 | 10 | 10 |
| EPOLENE N14 | 0 | 0 | 0 | 0 | 0 | 0 | 0 | 0 | 0 | 0 | 0 | 0 |
| EPOLENE N15 | 0 | 0 | 0 | 5 | 0 | 2.5 | 0 | 0 | 2.5 | 2.5 | 0 | 5.0 |
| LICOCENE 6102 | 0 | 0 | 0 | 0 | 0 | 0 | 0 | 0 | 0 | 0 | 5 | 0 |
| A-C596P | 0 | 0 | 0 | 1 | 1 | 1 | 1 | 1 | 2 | 1 | 1 | 1 |
| A-C597P | 1.48 | 1.48 | 0 | 0 | 0 | 0 | 0 | 0 | 0 | 0 | 0 | 0 |
| IRGANOX 1010 | 0.5 | 0.5 | 0 | 0.5 | 0.5 | 0.5 | 0.5 | 0.5 | 0.5 | 0.5 | 0.5 | 0.5 |
| IRGANOX 1076 | 0.5 | 0.5 | 0 | 0.5 | 0.5 | 0.5 | 0.5 | 0.5 | 0.5 | 0.5 | 0.5 | 0.5 |
| Properties | | | | | | | | | | | | |
| Viscosity at 177° C. (cP) | 930 | 800 | 630 | 770 | 1220 | 1350 | 1340 | 1200 | 1320 | 1140 | 1330 | 680 |
| Set Time (s) | 7 | 3.4 | 9 | <3 | <3 | <3 | <3 | 3 | 3 | <3 | 3.5 | <3 |
| Strain at Break (%) | 42 | 83 | 27 | 96 | 163 | 151 | 166 | 153 | 394 | 97 | 160 | 72 |
| Tensile Strength (MPa) | 1.29 | 0.96 | 1.83 | 4.92 | 5.61 | 3.45 | 3.5 | 3.74 | 3.83 | 4.67 | 4.54 | 4.87 |
| Energy to Break (J) | 0.05 | 0.07 | 0.04 | 0.31 | 0.41 | 0.4 | 0.43 | 0.4 | 1.0 | 0.35 | 0.46 | 0.21 |
| Heat Stress Resistance (° C.) | 60 | 57.2 | <54.4 | 68 | 65.6 | 57.2 | 65.6 | 60 | 71.1 | ND | 62.8 | 57.2 |
| Initial Gardner Color | 3 | 3 | 2 | 3 | 2 | 2 | 2 | ND | 1 | 1 | ND | 1 |
| Gardner Color after aging for 96 hours at 177° C. | ND | ND | ND | 6 | ND | ND | ND | ND | ND | ND | 4 | ND |
| Fiber Tear | | | | | | | | | | | | |
| −28.9° C. | 95 | 40 | 18 | 78 | 94 | 91 | 82 | 81 | 95 | 79 | 83 | 0 |
| −17.8° C. | 88 | 11 | 16 | 54 | 50 | 77 | 91 | 74 | 88 | 60 | 91 | 0 |
| 4.4° C. | 100 | 49 | 43 | 87 | 76 | 94 | 82 | 94 | 96 | 78 | 91 | 2 |
| 60° C. | ND | ND | 44 | ND | 100 | 100 | 100 | ND | ND | 88 | 100 | 100 |
| 65.6° C. | 83 | 94 | 15 | 86 | 100 | 100 | 100 | 100 | 100 | 89 | 100 | 78 |
| 71.1° C. | 74 | 92 | 35 | 79 | 100 | 100 | 100 | 100 | 96 | 89 | 81 | 30 |

EASTOTAC H130W = Eastman Chemical (Kingsport, Tennessee)
BARECO PX105 = Fischer Tropsch wax
EPOLENE N21 = polyethylene wax
EPOLENE N14 = polyethylene wax
EPOLENE N15 = polyethylene wax
A-C596P = maleated polypropylene wax (Honeywell International Inc., Morristown, New Jersey)
A-C597P = maleated polypropylene wax (Honeywell International)
IRGANOX 1010 = antioxidant (BASF Corporation, Florham Park, New Jersey)
IRGANOX 1076 = antioxidant (BASF Corporation)
ND = Not determined.

Viscosity Determination of Controls C1, C2 and C8-C11

The viscosity of the polymers of C1 and C2 and blends of 90% by weight polymer and 10% by weight wax of the type specified in Table 4 were determined according to the viscosity test method using spindle 27 at 177° C. The results are reported in centipoise ("cP") in Table 4.

TABLE 4

| Blend | C1 | C2 | C8 | C9 | C10 | C11 |
|---|---|---|---|---|---|---|
| Polymer | PP | PE | PP | PP | PP | PP |
| Wax | NA | NA | N11 | N14 | N21 | PX105 |
| Viscosity at 177° C. (cP) | 12000 | 5125 | ND | 7330 | 8940 | 7260 |

NA = Not Applicable
PP = MODU S400 polypropylene
PE = LICOCENE 2602 propylene-ethylene copolymer
EPOLENE N21 = polyethylene wax
EPOLENE N14 = polyethylene wax
EPOLENE N15 = polyethylene wax Other embodiments are within the claims. All references referred to herein are incorporated herein to the extent they do not conflict.

What is claimed is:

1. A propylene-wax copolymer comprising:
   the reaction product of components comprising
   a first polymer comprising polypropylene homopolymer, polypropylene-alpha-olefin copolymer, or a combination thereof,
   a first wax comprising polyethylene wax, Fischer Tropsch wax, or a combination thereof, and
   a free radical initiator, and
   being free of an unsaturated compound that includes at least one functional group and has a molecular weight no greater than 1000 g/mole,
   the reaction product having a number average molecular weight greater than 5000 g/mole, a polydispersity index of no greater than 5, and a viscosity of no greater than 12,000 centipoise at 177° C.

2. A propylene-wax copolymer comprising:
   the reaction product of components comprising
   a first polymer comprising polypropylene homopolymer, polypropylene-alpha-olefin copolymer, or a combination thereof,
   a first wax comprising polyethylene wax, and
   a free radical initiator,
   the reaction product having a number average molecular weight greater than 5000 g/mole, a polydispersity index no greater than 5, and a viscosity of no greater than 12,000 centipoise at 177° C.

3. A propylene-wax copolymer comprising:
   the reaction product of components comprising
   a first polymer having a polydispersity index of no greater than 5 and comprising polypropylene homopolymer, polypropylene-alpha-olefin copolymer, or a combination thereof,
   a first wax comprising polyethylene wax, Fischer Tropsch wax, paraffin wax, or a combination thereof,
   a free radical initiator, and
   being free of an unsaturated compound comprising at least one functional group and having a molecular weight no greater than 1000 g/mole,
   the reaction product exhibiting a viscosity of no greater than 12,000 centipoise at 177° C.

4. The copolymer of claim 1, wherein the reaction product exhibits a set time of no greater than 10 seconds.

5. The copolymer of claim 1, wherein the reaction product exhibits a set time of no greater than 5 seconds.

6. A composition comprising the copolymer of claim 1.

7. A hot melt adhesive composition comprising the copolymer of claim 1.

8. The hot melt adhesive composition of claim 7, wherein the hot melt adhesive composition exhibits an initial Gardner color of no greater than 3.

9. The hot melt adhesive composition of claim 7, further comprising tackifying agent, plasticizer, wax, or a combination thereof.

10. The hot melt adhesive composition of claim 7, wherein the composition is free of gelling after aging for 96 hours at 177° C.

11. The hot melt adhesive composition of claim 7, wherein the composition exhibits an energy to break of at least 0.15 Joules.

12. The hot melt adhesive composition of claim 7, wherein the composition exhibits a heat stress resistance of at least 60° C.

13. The hot melt adhesive composition of claim 7, wherein the composition exhibits a tensile strength of at least 1.38 MPa.

14. The hot melt adhesive composition of claim 7, wherein the composition exhibits a strain at break of at least about 100%.

15. The hot melt adhesive composition of claim 7, wherein the composition exhibits an energy to break of at least 0.15 Joules and a strain at break of at least 100%.

16. The hot melt adhesive composition of claim 7, wherein the composition exhibits an energy to break of at least 0.15 Joules and a heat stress resistance of at least 60° C.

17. The hot melt adhesive composition of claim 7, wherein the composition exhibits an energy to break of at least 0.15 Joules and a strain at break of at least 100%, and further comprises a second wax selected from the group consisting of polyethylene wax, polypropylene wax, Fischer Tropsch wax, paraffin, maleated polypropylene wax, and maleated polyethylene wax.

18. The hot melt adhesive composition of claim 7, wherein the composition exhibits an energy to break of at least 0.15 Joules and a heat stress resistance of at least 60° C., and further comprises a second wax selected from the group consisting of polyethylene wax, polypropylene wax, Fischer Tropsch wax, paraffin, maleated polypropylene wax, and maleated polyethylene wax.

19. The hot melt adhesive composition of claim 7, wherein the hot melt adhesive composition exhibits an energy to break of at least 0.15 Joules, a tensile strength of at least 3.28 MPa, a heat stress resistance of at least 65° C., or a combination thereof.

20. The hot melt adhesive composition of claim 7 further comprising a nucleating agent.

21. The copolymer of claim 1, wherein the first wax comprises a non-functionalized wax, and the components further comprise a second wax, the second wax comprising a functionalized wax.

22. A method of making a graft copolymer, the method comprising:
   blending a first polymer and a first wax in the presence of a free radical initiator for a period of time and under sufficient conditions to achieve a reaction product having a number average molecular weight greater than 5000 g/mole and a polydispersity index of no greater than 5,
   the first polymer comprising polypropylene homopolymer, polypropylene-alpha-olefin copolymer, or a combination thereof, and
   the first wax comprising polyethylene wax.

23. A method of making a graft copolymer, the method comprising:
blending a first polymer and a first wax in the presence of a free radical initiator and in the absence of an unsaturated compound comprising at least one functional group and having a molecular weight no greater than 1000 g/mole for a period of time and under sufficient conditions to achieve a reaction product having a number average molecular weight greater than 5000 g/mole and a polydispersity index of no greater than 5,
the first polymer comprising polypropylene homopolymer, polypropylene-alpha-olefin copolymer, or a combination thereof, and
the first wax comprising polyethylene wax, paraffin wax, Fischer Tropsch wax, or a combination thereof.

24. An article comprising:
a first substrate; and
a composition comprising the copolymer of claim 1 disposed on the substrate.

25. The article of claim 24, wherein the first substrate comprises cardboard.

26. The propylene-wax copolymer of claim 2, wherein the components further comprise an unsaturated compound that includes at least one functional group.

27. The propylene-wax copolymer of claim 26, wherein the unsaturated compound comprises maleic acid, maleic anhydride, fumaric acid, or a combination thereof.

28. A hot melt adhesive composition comprising the copolymer of claim 2.

29. A hot melt adhesive composition comprising the copolymer of claim 3.

30. A propylene-wax copolymer comprising:
a reaction product of components comprising
a first polymer comprising polypropylene homopolymer, polypropylene-alpha-olefin copolymer, or a combination thereof,
a first wax comprising polyethylene wax, Fischer Tropsch wax, or a combination thereof, and
a free radical initiator,
the reaction product having a viscosity at 177° C. that is less than the viscosity of a blend of the components of the reaction product other than the free radical initiator,
the reaction product having a number average molecular weight greater than 5000 g/mole, a polydispersity index of no greater than 5, and a viscosity of no greater than 12,000 centipoise at 177° C. greater than 5000 g/mole, a polydispersity index of no greater than 5, and a viscosity of no greater than 12,000 centipoise at 177° C.

* * * * *